3,527,720
EPOXY RESIN COMPOSITIONS INCLUDING
CASTOR OIL FOR FLEXIBILITY
Gaylord L. Groff, North St. Paul, Minn., assignor to Minnesota Mining and Manufacturing Company, St. Paul, Minn., a corporation of Delaware
No Drawing. Continuation-in-part of application Ser. No. 663,205, Aug. 25, 1967, which is a continuation-in-part of application Ser. No. 354,094, Mar. 23, 1964. This application Apr. 7, 1969, Ser. No. 814,163
Int. Cl. C08g 30/12; C08k 1/66
U.S. Cl. 260—18
16 Claims

ABSTRACT OF THE DISCLOSURE

Thermosetting composition of epoxy resin, castor oil and dibasic carboxylic acid anhydride, said ingredients being so selected that the composition in the absence of filler is a free-flowing liquid at room temperature but cures upon moderate heating to provide tough, flexible electrical insulation suitable for continuous exposure to 155° C. To achieve these properties, the ingredients should be present such that there are (a) 50–110 parts by weight of castor oil per 100 parts of epoxy resin, (b) about 1.1 to 1.5 oxirane groups per anhydride group, and (c) at least 20% more anhydride groups than are necessary to provide one anhydride group per castor oil hydroxyl group. Part or all of the castor oil may be replaced by synthetic liquid condensates of ricinoleic acid and polyhydric alcohols.

CROSS-REFERENCES TO RELATED APPLICATIONS

This application is a continuation-in-part of applicant's copending application Ser. No. 663,205, filed Aug. 25, 1967, now abandoned, which in turn was a continuation-in-part of applicant's application Ser. No. 354,094, filed Mar. 23, 1964, now abandoned.

Field of the invention

This invention relates to thermosetting resin compositions which are free-flowing liquids at room temperature but autogenously cure upon moderate heating to a tough, flexible, thermoset state. As compared to known resin compositions which cure to a flexible state, the compositions of the present invention afford unusually good electrical insulation in uses involving exposure to high temperatures and high humidity.

BACKGROUND OF THE INVENTION

Electrical insulating casting resins should be of sufficiently low viscosity that when poured into a mold containing an electrical component, all interstices of the component are impregnated. The resin should remain usefully free-flowing for over an hour, but should cure quickly upon moderate heating to a sufficiently tough, adherent state to endure any thermal and mechanical shock to which the cured product may be subjected in use while providing good electrical insulation under possibly adverse conditions. Resins which satisfy these requirements have been commercially available for many years, but in spite of long felt need, no such resin has been suitable for Class F operation, i.e., continuous exposure to 155° C. or above, except for silicone resins which are too expensive for general use.

SUMMARY OF THE INVENTION

The answer to this need is found in the thermosetting resin composition of this invention which is conveniently marketed in two parts, each of which can be stored indefinitely under ordinary warehouse conditions. In the absence of filler or thixotropic agent, mixtures of the two parts can be maintained in a free-flowing liquid state at room temperature for hours, normally permitting a full day's supply to be made up in the morning. One part (Part A) is normally based on polyglycidyl ether of polyhydric phenol preferably containing at least 1.5 oxirane groups per average molecular weight and having a viscosity of less than 30,000 cps. at 24° C. The second part (Part B) normally contains a mixture of (1) a carboxyl-containing reaction product of castor oil and certain dibasic carboxylic acid anhydrides and (2) excess low melting dibasic carboxylic acid anhydride.

Dibasic carboxylic acid anhydrides which can be used to make the carboxyl-containing reaction product of castor oil include maleic anhydride and dibasic polycarboxylic acid anhydrides having a melting point not greater than about 40° C., which low melting anhydrides are adducts of maleic anhydride and olefin. Among such anhydrides are methyl-endomethylene tetrahydrophthalic anhydride (a light yellow semi-viscous liquid with a viscosity of 138.4 cps. at 25° C. available commercially as "Methyl Nadic Anhydride"). Another is the adduct of myrcene and maleic anhydride which may be prepared as follows: maleic anhydride (34.6 lbs.) is charged to the reaction vessel and heated to 145° F. Myrcene (64 lbs.) is added slowly to the vessel, and the temperature of the reactants is maintained below 150° F. until all the myrcene is added. After the addition of myrcene is completed, the reaction vessel is heated to 200° F. for two hours. It is then permitted to cool to 150° F., at which temperature the pressure in the vessel is slowly reduced to 20–30 mm., after which the temperature is raised to 300° F. When all the distillate has been removed in this manner, the reaction vessel is cooled to 175° F., and the low melting product of the reaction, myrcene-maleic anhydride, is drained into a storage container. Other useful anhydride adducts of maleic anhydride and olefin include hexahydrophthalic anhydride (M.P. 36° C.) and the alkenyl succinic anhydrides such as the liquid tetrapropenyl succinic anhydride which is prepared by heating together equimolar proportions of maleic anhydride and olefin which is primarily the tetramer of propylene.

The same anhydrides are useful as the excess anhydride over and above that necessary to fully carboxylate the castor oil. Particularly useful for this purpose is tetrapropenyl succinic anhydride since it provides compositions of very low viscosity. Hexahydrophthalic anhydride also is an especially good viscosity depressant. Maleic anhydride is less preferred for this purpose since it tends to volatilize and give toxic problems. It is generally used in amounts to provide at most one anhydride group of maleic anhydride per hydroxyl group of castor oil.

Higher melting dibasic carboxylic acid anhydrides may be substituted for part of the above-described anhydrides without countering the free flowing nature of the novel compositions. For example, a large proportion of the anhydride may be tetrahydrophthalic anhydride, which can be used in amounts up to about half of the total anhydride by weight where other ingredients of the composition contribute to low viscosity. Fairly large amounts of glutaric anhydride can also be used, as can lesser, but still significant, amounts of phthalic anhydride or succinic anhydride. Where improved flame retardance is desired, a small amount of tetrabromophthalic anhydride or hexachloroendomethylene tetrahydrophthalic anhydride ("chlorendic anhydride") may be used, preferably together with antimony trioxide and inert fillers. The latter anhydride reacts easily with castor oil to provide a useful carboxyl-containing reaction product but can be used in somewhat larger proportions if the castor oil is prereacted with maleic anhydride and it is simply employed as a part of the excess anhydride along with a low-viscosity anhydride such as tetrapropenyl succinic anhydride.

The carboxyl-containing reaction product may be prepared simply by heating at 250° F. for several hours a mixture of the castor oil and dibasic anhydride in equivalent amounts, i.e., one hydroxyl group of castor oil for each anhydride group. The reaction is greatly accelerated by an esterification catalyst such as stannous octoate or stannous fluoride or a tertiary amine. Lower temperatures provide the same product at longer times, and even at normal room temperature, carboxylation of the castor oil is nearly complete after two months in the presence of an esterification catalyst. Accordingly, Part B may be made up of castor oil and the low melting anhydride adduct without any prereaction if an esterification catalyst is present, and after the usual elapse of time in packaging, storage, shipping and distribution before being put to use, the esterification will normally be nearly complete. Even if not, mixtures of polyglycidyl ether and the partially carboxylated castor oil plus excess low melting anhydride provide cured products which are substantially indistinguishable from those wherein the castor oil has been completely prereacted. In fact, the composition of the present invention may be marketed with one part including only unreacted castor oil and the other including both the polyglycidyl ether of polyhydric phenol and all the anhydride as long as there is an esterification catalyst present to insure esterification reaction between the castor oil and anhydride when the two parts are mixed. Such packaging is generally less preferred because of reduced storability stemming from the tendency of the polyglycidyl ether and anhydride to interact. Furthermore, at least some of the anhydride is preferably included in the Part B containing the castor oil or carboxyl-containing reaction product thereof to assist in equalizing the volume of the two parts for ease of measuring.

The novel composition should contain about 1.1 to 1.5 oxirane groups of the polyglycidyl ether for every carboxyl group attached to the castor oil and for every anhydride group of unreacted anhydride. At much over 1.5 oxirane groups for every carboxyl and anhydride group, there is substantial danger that all the polyglycidyl ether may not react, in which case the cured product might be undesirably subject to degradation upon exposure to adverse conditions. At less than one oxirane group for every carboxyl and anhydride group, the cured product is less resistant to high temperatures, both in electrical insulating values and in resistance to degradation. However, at present market prices the polyglycidyl ether is considerably more expensive than castor oil and the low melting anhydrides so that for noncritical uses it might prove expedient if the total number of carboxyl and anhydride groups slightly exceeds the number of oxirane groups.

The amount of castor oil (when esterified, the amount is based on the castor oil before reaction with the anhydride) in the novel compositions should fall within the approximate range of 50–110 parts by weight per 100 parts of polyglycidyl ether of polyhydric phenol. At less than about 50 parts, the cured product may have less toughness and flexibility than desired, whereas at substantially over 110 parts, the cured product tends to be somewhat weak and to lack the high-temperature electrical insulating properties to which the invention is primarily directed.

As part or all of the castor oil may be used synthetic liquid condensates of ricinoleic acid and polyhydric aliphatic alcohols such as glycerine, dipropylene glycol, pentaerythritol, and trimethylol propane, which condensates are characterized by:

Molecular weight of about 350–1100
Hydroxyl number of about 100–350
Functionality of about 2–5
Viscosity at 24° C. of 30–4000 cps.

The castor oil should be refined and may be non-hydrogenated or partially hydrogenated, but it is preferred that the WIJS iodine value be greater than 50. At iodine values above 50, the castor oil and adducts thereof are sufficiently free-flowing that the initial viscosity of the novel compositions usually is well below 30,000 cps. at 24° C., whereas it may be difficult to stay below this viscosity using more highly hydrogenated castor oil.

The novel composition should contain at least about 20% more anhydride groups than are necessary to provide one anhydride group for each hydroxyl group originally present in the castor oil. Unless there is such an excess of unreacted anhydride, the cured product tends to be somewhat weak and cheezy for general electrical encapsulating use.

The composition includes a catalyst of the type known to accelerate acid-curing epoxy resin compositions in such amount that the two-part composition is substantially cured within 16 hours at 150° C. Suitable catalysts include tertiary amines such as dimethylbenzyl amine and salts thereof; Lewis acids such as stannnic chloride or boron trifluoride, usually an amine complex thereof; metal soaps such as stannous octoate.

Particularly useful as the polyglycidyl ether are liquid condensation products of epichlorohydrin and bisphenol A [bis(4 - hydroxyphenyl)dimethylmethane], typical of which is "Epon" 828 which has a Durrans' softening point of about 10° C., a viscosity at 25° C. of 5,000–15,000 cps. and an epoxide equivalent of about 190. Another class of useful liquid epoxy resins is the epoxidized novolacs typified by Borden's "Epiphen" 849, which was identified by Borden as having a viscosity at 25° C. of 10,000–20,000 cps. and an epoxide equivalent of 180–200 and having the structure

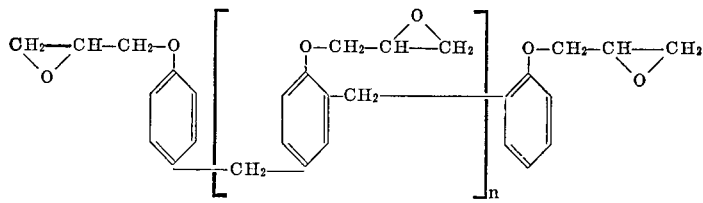

The diglycidyl ether of resorcinol is also useful.

To obtain lower viscosity in the novel composition and greater flexibility of cured product, at some expense in toughness, monoepoxides may be included in amounts up to about 20% by weight of the polyglycidyl ether, but not in such large amounts that the composition does not readily cure to a tough, essentially infusible, insoluble state. Typical useful monoepoxides are dodecene oxide, octylene oxide, dipentene monoxide, alpha-pinene oxide, styrene oxide, phenyl glycidyl ether, vinylcyclohexene-monoxide, and epoxidized long-chain olefins, e.g. of 16–18 carbon atoms.

Castor oil-maleic anhydride reaction product

This reaction product was prepared using #3 castor oil which has a WIJS iodine value of 86, a hydroxyl value of 154 (365 grams per hydroxyl group), and a viscosity of 660 cps. at 25° C. The recipe follows:

| | Parts by weight |
|---|---|
| #3 Castor oil | 365 |
| Maleic anhydride | 98 |
| Stannous octoate | 0.46 |

The castor oil and stannous octoate were mixed together and heated to 250° F. in a glass jar. The maleic anhydride was added with stirring while the mixture was allowed to cool to 200° F., after which the whole was cooked at 250° F. for two hours with frequent stirring. The reaction product was a clear liquid with a viscosity at 24° C. of 4300 cps. It has a saponification equivalent weight of 147 from which it was calculated that one ester group was present in 225 grams. This indicates that every hydroxyl group was esterified with the maleic anhydride. Nonaqueous titration yielded an acid equivalent of 2.35 meq./gm. while aqueous titration yielded an acid equivalent of 2.52 meq./gm. The difference between the aqueous and nonaqueous titrations indicated that there was some free maleic anhydride in the product. Infrared analysis also indicated this. The product was compatible with "Epon" 828-type polygylcidyl ether at room temperature in all proportions.

Castor oil-hexahydrophthalic anhydride reaction product

| | Parts by weight |
|---|---|
| #3 Castor oil | 365 |
| Hexahydrophthalic anhydride | 154 |
| Stannous octoate | 0.5 |

The hexahydrophthalic anhydride was melted at 150° F. and mixed with the castor oil and stannous octoate in a glass jar. This was heated to 250° F. and cooked with frequent stirring for two hours. The reaction product had a viscosity of 55,000 cps. at 24° C. Aqueous titration yielded an acid equivalent of 2.15 meq./gm.

Castor oil-tetrahydrophthalic anhydride reaction product

| | Parts by weight |
|---|---|
| #3 Castor oil | 365 |
| Tetrahydrophthalic anhydride | 152 |
| Stannous octoate | 1.3 |

The above ingredients were charged to a glass jar, and heat was applied to raise the temperature to 250° F., which temperature was maintained for two hours with frequent stirring. The reaction product was a dark straw color with a viscosity of 41,000 cps. at 24° C. Aqueous titration yielded an acid equivalent of 2.27 meq./gm.

EXAMPLE I

The above-described castor oil-maleic anhydride reaction product was mixed with various proportions of tetrapropenyl succinic anhydride (TPSA) and dimethylbenzyl amine to form stable blends which were then mixed with liquid polyglycidyl ether of bisphenol A ("Epon" 828) to provide the following compositions in parts by weight:

| | Compositions | | |
|---|---|---|---|
| | A | B | C |
| "Epon" 828 | 100 | 100 | 100 |
| Castor oil—maleic anhydride reaction product | 80 | 80 | 80 |
| TPSA | 90 | 82 | 70 |
| Dimethylbenzyl amine | 1.35 | 1.0 | 1.25 |

The ratio of oxirane groups of the polyglycidyl ether to the total of carboxyl groups of the castor oil-maleic anhydride reaction product plus anhydride groups of the TPSA was: Composition A, 1.02; Composition B, 1.09; Composition C, 1.20.

Initial viscosities of these compositions were in the range of 4,000–5,000 cps. at 24° C. Castings of each compositions gelled in about 20 minutes at 130° C. and after a 16-hour cure at that temperature exhibited the properties listed below. Water absorption tests were made by immersion of castings measuring 3″ x 1″ x ⅛″, and heat resistance was determined by placing castings measuring 2″ x 2″ x ½″ in an air-circulating oven at 155° C.

TABLE A

| | Composition | | |
|---|---|---|---|
| | A | B | C |
| Hardness, Shore D | 72 | 70 | 65 |
| Water absorption: | | | |
| Gain after 1 week immersion at RT, percent | 0.4 | 0.5 | 0.4 |
| Gain after 1 week immersion at 100° C, percent | 4.7 | 2.2 | 2.5 |
| Shore D hardness after 100° C. immersion | 50 | 30 | 30 |
| Heat resistance: | | | |
| Loss after 1 week in 155° C. oven, percent | 1.4 | 0.8 | 0.7 |
| Shore D harness after test | 80 | 80 | 82 |
| Mechanical shock resistance: (U.S. Mil. Spec. Mil-I-16923D) resisted ball size, inches | 3¾ | 3¾ | 3¾ |
| Dissipation factor at 109 volts, 100 cycles at— | | | |
| 23° C | .02 | .03 | .02 |
| 105° C | .16 | .04 | .02 |
| 155° C | Off scale | 1.51 | .37 |
| 180° C | | Off scale | .45 |
| Dielectric Constant at 109 volts, 100 cycles at— | | | |
| 23° C | 3.3 | 3.5 | 3.5 |
| 105° C | 5.0 | 4.9 | 5.0 |
| 155° C | Off scale | 11.9 | 4.7 |
| 180° C | | Off scale | 4.5 |
| Volume resistivity at 500 volts DC (ohm-cm.) at— | | | |
| 23° C | $2.0 \times 10^{14}$ | $8.9 \times 10^{14}$ | $2.2 \times 10^{14}$ |
| 105° C | $4.3 \times 10^{10}$ | $9.9 \times 10^{10}$ | $2.5 \times 10^{11}$ |
| 155° C | $4.4 \times 10^{9}$ | $2.5 \times 10^{9}$ | $1.9 \times 10^{10}$ |
| 180° C | $3.7 \times 10^{9}$ | $2.1 \times 10^{9}$ | $1.4 \times 10^{10}$ |

The foregoing data indicates that cured products of Composition C are characterized by extraordinarily good toughness, resistance to degradation and electrical insulating values and provide a very significant advance in such qualities in comparison to previously known resinous products of the flexible type. Composition B advances the art in the same general way but to a less dramatic extent than does Composition C. Composition A, which is clearly inferior to Compositions B and C, is not claimed.

EXAMPLE II

A series of 12 compositions was prepared with the same ingredients and cured in the same manner as in Example I except that in place of the dimethylbenzyl amine catalyst was used 1.25 parts by weight of tris(2,4,6 - dimethylaminomethyl)phenol ("DMP-30") per 100 parts of the polyglycidyl ether. The amount of TPSA was controlled such that each composition contained about 1.1 to 1.5 oxirane groups for every carboxyl group of the Castor Oil-Maleic Anhydride Reaction Product and for every anhydride group of the TPSA. The four major ingredients from which each of the 12 compositions was prepared were, in parts by weight:

| "Epon" 828 | 100 | 100 | 100 | 100 | 100 | 100 | 100 | 100 | 100 | 100 | 100 | 100 |
|---|---|---|---|---|---|---|---|---|---|---|---|---|
| Castor oil | 63 | 63 | 63 | 63 | 83.5 | 83.5 | 83.5 | 83.5 | 96 | 96 | 96 | 96 |
| Maleic anhydride | 17 | 17 | 17 | 17 | 22.5 | 22.5 | 22.5 | 22.5 | 26 | 26 | 26 | 26 |
| TPSA | 82 | 70 | 59 | 47 | 67 | 55 | 44 | 32 | 58 | 46 | 35 | 23 |

Two specimens of each cured composition were conditioned overnight at 23° C. and 50% relative humidity and then tested at 23° C. for hardness and for electrical insulating properties. The temperature was then raised to and maintained at 60° C. while the electrical insulating properties of each specimen were measured, after which the temperature was successively increased to and leveled off for electrical testing at each of 90°, 105°, 120°, 130°, 155°, 180° and 200° C. This procedure required a total of about 7–8 hours so that the castings tested at 200° C. had in effect been post-cured at temperatures above 100° C. for about 5–6 hours.

Table B lists the hardness at 23° C. (Shore D) for each of the 12 compositions.

TABLE B.—SHORE D HARDNESS AT 23° C.

| Oxirane/acid ratio | Parts castor oil per 100 parts polyglycidyl ether | | |
|---|---|---|---|
| | 63 | 83.5 | 96 |
| 1.09 | 76 | 33 | 23 |
| 1.20 | 58 | 27 | 21 |
| 1.33 | 42 | 23 | 20 |
| 1.50 | 33 | 21 | 18 |

The Shore D values at 23° C. of 18–42 indicate a high degree of flexibility whereas the higher values indicate lesser flexibility.

The electrical tests were for dissipation factor and dielectric constant at 100 cycles, and for volume resistivity in ohm-cm. at 500 volts DC. Reported below are results at 105°, 155° and 200° C. for dissipation factor (Tables C–E, respectively) and for volume resistivity (Tables F–H, respectively).

TABLE C.—DISSIPATION FACTOR AT 105° C.

| Oxirane/acid ratio | Parts castor oil per 100 parts polyglycidyl ether | | |
|---|---|---|---|
| | 63 | 83.5 | 96 |
| 1.09 | .012 | .069 | .098 |
| 1.20 | .006 | .011 | .020 |
| 1.33 | .006 | .014 | .014 |
| 1.50 | .014 | .017 | .021 |

TABLE D.—DISSIPATION FACTOR AT 155° C.

| Oxirane/acid ratio | Parts castor oil per 100 parts polyglycidyl ether | | |
|---|---|---|---|
| | 63 | 83.5 | 96 |
| 1.09 | .78 | 1.52 | Off scale |
| 1.20 | .18 | .32 | .50 |
| 1.33 | .12 | .24 | .28 |
| 1.50 | .12 | .16 | .29 |

TABLE E.—DISSIPATION FACTOR AT 200° C.

| Oxirane/acid ratio | Parts castor oil per 100 parts polyglycidyl ether | | |
|---|---|---|---|
| | 63 | 83.5 | 96 |
| 1.09 | Off | Off | Off |
| 1.20 | .42 | .98 | 1.05 |
| 1.33 | .38 | .58 | .58 |
| 1.50 | .38 | .54 | .71 |

TABLE F.—VOLUME RESISTIVITY AT 105° C.

| Oxirane/acid ratio | Parts castor oil per 100 parts polyglycidyl ether | | |
|---|---|---|---|
| | 63 | 83.5 | 96 |
| 1.09 | $3.9 \times 10^{11}$ | $3.4 \times 10^{11}$ | $6.2 \times 10^{10}$ |
| 1.20 | $7.6 \times 10^{11}$ | $4.0 \times 10^{11}$ | $4.1 \times 10^{11}$ |
| 1.33 | $6.5 \times 10^{11}$ | $3.0 \times 10^{11}$ | $3.1 \times 10^{11}$ |
| 1.50 | $5.9 \times 10^{11}$ | $3.6 \times 10^{11}$ | $2.6 \times 10^{11}$ |

TABLE G.—VOLUME RESISTIVITY AT 155° C.

| Oxirane/acid ratio | Parts castor oil per 100 parts polyglycidyl ether | | |
|---|---|---|---|
| | 63 | 83.5 | 96 |
| 1.09 | $8.7 \times 10^{9}$ | $3.7 \times 10^{9}$ | $3.0 \times 10^{9}$ |
| 1.20 | $3.3 \times 10^{10}$ | $2.0 \times 10^{10}$ | $1.2 \times 10^{10}$ |
| 1.33 | $4.9 \times 10^{10}$ | $2.6 \times 10^{10}$ | $2.2 \times 10^{10}$ |
| 1.50 | $4.5 \times 10^{10}$ | $2.3 \times 10^{10}$ | $2.0 \times 10^{10}$ |

TABLE H.—VOLUME RESISTIVITY AT 200° C.

| Oxirane/acid ratio | Parts castor oil per 100 parts polyglycidyl ether | | |
|---|---|---|---|
| | 63 | 83.5 | 96 |
| 1.09 | $4.8 \times 10^{9}$ | $3.2 \times 10^{9}$ | $3.7 \times 10^{9}$ |
| 1.20 | $1.5 \times 10^{10}$ | $5.8 \times 10^{9}$ | $5.4 \times 10^{9}$ |
| 1.33 | $1.4 \times 10^{10}$ | $8.9 \times 10^{9}$ | $8.5 \times 10^{9}$ |
| 1.50 | $1.3 \times 10^{10}$ | $1.3 \times 10^{10}$ | $9.7 \times 10^{9}$ |

Inasmuch as low values for dissipation factor and high values for volume resistivity are desired for electrical insulation, it is seen from Tables C–H that the best electrical insulation at high temperatures (for a given degree of hardness or flexibility) was afforded by those compositions which contained 1.20 and 1.33 oxirane groups of polyglycidyl ether for every carboxyl group of the "castor oil-maleic anhydride reaction product" and for every anhydride group of unreacted anhydride.

The electrical measurements at the other test temperatures provided comparable data except that at room temperature, the highest degree of electrical insulation was afforded at the oxirane/acid ratio of 1.09. However, electrical insulating values at room temperature are excellent not only for all of the compositions of the present invention, but also for compositions of the same ingredients at ratios well outside these claimed here. It is only for high-temperature performance that it is important to keep the oxirane/acid ratio within about 1.1 to 1.5.

Minimum values for dielectric constant at 155° C. were obtained with products of the compositions having oxirane/acid ratios of 1.20 and 1.33, which is desirable for most uses. However, the differences were not such as to be worthy of special consideration.

All of these 12 compositions had at least 20% more anhydride groups than were necessary to provide one anhydride group for each hydroxyl group originally present in the castor oil. The lowest anhydride excess was in the composition having an oxirane/acid ratio of 1.50 and 96 parts castor oil, its anhydride excess being 33%.

EXAMPLE III

In the prior art, the compositions most similar to those of the present invention are reported in "Development of Flexible Polymers as Thermal Insulation in Solid-Propellant Rocket Motors," the First Annual Summary Report for the period from June 24, 1960 to June 24, 1961 by Atlantic Research Corp. to the Rock Island Arsenal. This report is cataloged by ASTIA as AD262986. Believed to be most pertinent are the first two compositions at the top of page 10 of the report, which two compositions are here referred to as ASTIA–1 and ASTIA–2.

These and three representative compositions of the present invention were prepared using #1 castor oil, methylendomethylene tetrahydrophthalic anhydride ("Methyl Nadic Anhydride" or "Nadic Methyl Anhydride" or "NMA"), and tris(2,4,6 - dimethylaminomethyl)phenol ("DMP–30"), and the epoxy resin of Example I ("Epon" 828) as follows:

| | Compositions in parts by weight | | | | |
|---|---|---|---|---|---|
| | ASTIA–1 | D | E | F | ASTIA–2 |
| "Epon" 828 | 100 | 100 | 100 | 100 | 100 |
| "NMA" | 67 | 67 | 67 | 67 | 58 |
| Castor oil | 42 | 50 | 60 | 68 | 68 |
| "DMP–30" | 1.25 | 1.25 | 1.25 | 1.25 | 1.25 |

Each of these compositions included 1.40 oxirane groups for each anhydride group, except that ASTIA–2 included 1.60 oxirane groups for each anhydride group.

Ten samples of each of these compositions were prepared for thermal shock testing containing the ¼-inch Olyphant washer as described in Lee & Neville: "Handbook of Epoxy Resins," McGraw-Hill 1967, at pages 17–17 through 17–20. After curing for 16 hours at 130° C., the Shore D hardness was measured and thermal shock testing was carried out as follows. Each cured specimen was heated to 130° C. for ½ hour, immediately plunged into an alcohol bath at −55° C., withdrawn 10 minutes later and examined for cracks. After six such cycles, the next three cycles were between 155° C. and −55° C., and cycles No. 10–13 were between 155° C. and −65° C. Hence, by the completion of such testing, each uncracked specimen had been heated in the thermal shock test for 6½ hours.

In this test, one specimen of Composition E cracked on the second cycle, one specimen of Composition F cracked on the 11th cycle and one specimen of Composition D cracked on the 12th cycle. The other specimens representing the present invention had not cracked when the test was discontinued.

Five specimens of ASTIA–1 cracked: one on the 7th cycle, three on the 10th and one on the 13th cycle. Four specimens of ASTIA–2 cracked: three on the 11th and one on the 13th cycle. Results are summarized in Table I.

TABLE I

|  | Composition | | | | |
|---|---|---|---|---|---|
|  | ASTIA-1 | D | E | F | ASTIA-2 |
| Hardness (Shore D) | 87 | 82 | 76 | 67 | 53 |
| Total failures on thermal cycling | 5 | 1 | 1 | 1 | 4 |

If 8 out of 10 specimens of a composition do not crack in a given thermal shock test, the composition is generally considered to have passed the test.

From this thermal shock test, it appears that the 42 parts castor oil of the ASTIA–1 composition does not provide flexibility and toughness of cured product equivalent to compositions of the present invention which contain 50 parts or more of the caster oil per 100 parts of polyglycidyl ether. As for the ASTIA–2 composition which contains 68 parts castor oil, this test shows the value of not exceeding an oxirane/acid ratio of about 1.5.

EXAMPLE IV

The above-described castor oil-maleic anhydride reaction product was used in making up the following formulation:

|  | Parts by weight |
|---|---|
| "Epon" 828 | 100 |
| Castor oil-maleic anhydride reaction product | 90 |
| Hexahydrophthalic anhydride | 43 |
| Powdered talc | 155 |
| Dimethylbenzyl amine | 1.16 |

The ratio of oxirane groups to the total of carboxyl groups of the castor oil reaction product plus the unreacted anhydride groups in the composition was about 1.11.

Castings of this composition gelled in 15–20 minutes at 120° C. and after a 16-hour cure at this temperature had the following properties, determined as in Example I.

Hardness, Shore D—75
Water Absorption:
    Gain after 1 week at RT—.29%
    Gain after 1 week at 100° C.—6.4%
    Shore D Hardness after 100° C. test—57
Heat resistance:
    Loss after 1 week in 155° C. oven—.18%
    Barcol hardness after test—24
Mechanical shock resistance:
    Resisted ball size—3¼"

|  | Dissipation factor | Dielectric constant | Volume resistivity |
|---|---|---|---|
| 23° C | .036 | 4.63 | $8.7 \times 10^{13}$ |
| 105° C | .059 | 6.56 | $2.0 \times 10^{11}$ |
| 155° C | .284 | 5.89 | $3.6 \times 10^{10}$ |
| 180° C | .301 | 5.80 | $2.4 \times 10^{10}$ |

EXAMPLE V

|  | Parts by weight |
|---|---|
| "Epon" 828 | 100 |
| Castor oil-hexahydrophthalic anhydride reaction product | 90 |
| Tetrapropenyl succinic anhydride | 72 |
| Tris-2,4,6(dimethylaminomethyl)phenol | 1.3 |

The ratio of oxirane groups of the "Epon" 828 polyglycidyl ether to the total of carboxyl groups of the castor oil reaction product plus anhydride groups of the TPSA in the composition was about 1.20. Initial viscosity of the composition at 24° C. was 8000 cps.

When heated to 120° C., the composition gelled in about 15 minutes and after two hours at that temperature had cured to a tough casting having a Shore D hardness of 66 at room temperature. The casting, which was 2 inches square and about ½ inch in thickness, exhibited good impact resistance in that it did not crack when repeatedly thrown hard onto the floor.

EXAMPLE VI

Seventy parts of heaxhydrophthalic anhydride were melted at 150° F. and mixed into 100 parts of "Epon" 828 polyglycidyl ether. Then 63 parts of #3 castor oil and 1.2 parts of tris - 2,4,6(dimethylaminomethyl)phenol ("DMP–30") were mixed in to provide a thick, incompatible, but free-flowing (less than 30,000 cps.) liquid composition at 24° C. which when heated to 67° C. was clear and of very low viscosity.

This composition gelled in 15 minutes at 120° C. and after two hours had cured to a clear, hard, tough casting (2 inch diameter, ½ inch thick) having a hardness at 24° C. of 72, Shore D. The casting did not break when thrown hard against the floor. The "DMP–30" was used here both as an esterification catalyst and to accelerate the cure with the polyglycidyl ether.

EXAMPLE VII

To 170 parts of the anhydride-polyglycidyl ether blend of Example VI was added 60 parts of "Polycin" 53 which is a condensate of ricinoleic acid and polyhydric aliphatic alcohol, which condensate had an approximate functionality of 2.2, a hydroxyl number of 254, a specific gravity at 25° C. of 0.969, and a viscosity at 25° C. of 380. To this was added 1.15 parts of "DMP–30". The composition was clear and had a viscosity of 1150 cps. at 24° C.

When heated to 120° C., the composition gelled in 15–20 minutes and after a one-hour cure provided a clear, hard, tough casting (2 inch diameter, ½ inch thick) having a hardness at 24° C. of 50, Shore D. The cured product was tested for mechanical shock resistance under Mil. Spec. Mil–I–16923D (except for change in geometry of casting), resisting the 3¾ inch ball. Such toughness indicates that each of the ingredients of the composition entered into the cure.

EXAMPLE VIII

The above-described castor oil-tetrahydrophthalic anhydride reaction product was used in making up the following formulation:

|  | Parts by weight |
|---|---|
| "Epon" 828 | 100 |
| Castor oil-tetrahydrophthalic anhydride reaction product | 90 |
| Tetrapropenyl succinic anhydride | 72 |
| Tris-2,4,6(dimethylaminomethyl)phenol | 1.3 |

The ratio of oxirane groups of the polyglycidyl ether to the total of carboxyl groups of the castor oil reaction product plus anhydride groups of the TPSA in the composition was about 1.17.

Initial viscosity of the composition at 24° C. was 7500 cps. When heated to 120° C., the composition gelled in about 15 minutes and after two hours at that temperature had cured to a tough casting having a Shore D hardness of 62 at room temperature. The casting, which was about 2 inches in diameter and about ½ inch thick, exhibited good impact resistance in that it did not crack when repeatedly thrown hard against the floor.

Where desired, various pigments, thixotropic agents or fillers (granules or fibers) may be incorporated in the thermosetting compositions of this invention. For example mica, talc, calcium carbonate and silica have shown good utility in that cured products containing large percentages of these materials in powdered form have exhibited excellent strength and toughness and electrical insulating properties.

Since these compositions are marketed in two parts for stability, it is usually desirable to color them differently for an indication of complete mixing.

I claim:

1. A solvent-free thermosetting electrically insulating resin composition which in the absence of filler is initially a free flowing liquid at room temperature but cures upon moderate heating to a tough, flexible, heat-resistant state affording excellent electrical insulating values at high temperatures, said composition consisting essentially of a mixture of
   (A) polyglycidyl ether of polyhydric phenol having a viscosity of less than 30,000 cps. at 24° C. and containing at least 1.5 oxirane groups per average molecular weight,
   (B) a blend of
      (1) liquid condensate of ricinoleic acid and polyhydric aliphatic alcohol, which condensate has an iodine value of at least 50 and is present in the amount of 50–110 parts by weight per 100 parts of said polyglycidyl ether, and
      (2) dibasic carboxylic acid anhydride selected from the group consisting of maleic anhydride and anhydride adducts of maleic anhydride and olefin, which adducts have a melting point not greater than 40° C., and
   (C) a catalyst which accelerates acid-curing epoxy resin compositions,
      which composition includes about 1.1 to 1.5 oxirane groups of polycidyl ether for every carboxyl group produced by reaction between said condensate and the anhydride and for every anhydride group of unreacted anhydride,
      and includes at least 20% more anhydride groups than are necessary to provide one anhydride group for each hydroxyl group originally present in said condensate.

2. A thermosetting resin composition as defined in claim 1 wherein said condensate is prereacted with a portion of the dibasic carboxylic acid anhydride.

3. A thermosetting resin composition as defined in claim 1 wherein said condensate is castor oil.

4. A thermosetting resin composition as defined in claim 1 wherein the dibasic carboxylic acid anhydride comprises maleic anhydride.

5. A thermosetting resin composition as defined in claim 1 wherein the dibasic carboxylic acid anhydride comprises hexahydrophthalic anhydride.

6. A thermosetting resin composition as defined in claim 1 wherein the dibasic carboxylic acid anhydride comprises ankenyl succinic anhydride.

7. A thermosetting resin composition as defined in claim 1 wherein the dibasic carboxylic acid anhydride comprises myrcene-maleic anhydride.

8. A thermosetting resin composition as defined in claim 1 wherein the dibasic carboxylic acid anhydride comprises methyl-endomethylene tetrahydrophthalic anhydride.

9. A solvent-free thermosetting electrically insulating resin composition which in the absence of filler is initially a free flowing liquid at room temperature but cures upon moderate heating to provide tough, flexible, heat-resistant electrical insulation, said composition consisting essentially of a mixture of
   (A) polyglycidyl ether of polyhydric phenol having a viscosity of less than 30,000 cps. at 24° C. and containing at least 1.5 oxirane groups per average molecular weight,
   (B) a blend of
      (1) the carboxyl-containing reaction product of
         (a) liquid condensate of ricinoleic acid and polyhydric aliphatic alcohol, which condensate has an iodine value of at least 50 and is present in the amount of 50–110 parts by weight per 100 parts of said polyglycidyl ether, and
         (b) dibasic carboxylic acid anhydride selected from the group consisting of maleic anhydride and anhydride adducts of maleic anhydride and olefin, which adducts have a melting point not greater than 40° C., and
      (2) additional anhydride adduct of maleic anhydride and olefin, which adduct has a melting point not greater than 40° C., and
   (C) a catalyst which accelerates acid-curing epoxy resin compositions,
      which composition includes a ratio of oxirane groups of polyglycidyl ether to total carboxyl groups of said carboxyl-containing reaction product (1) plus unreacted anhydride groups within the range of about 1.1:1 to 1.5:1,
      and includes at most one anhydride group of maleic anhydride per hydroxyl group originally present in said condensate and at least 20% more anhydride groups than are necessary to provide one anhydride group for each hydroxyl group originally present in said condensate.

10. A solvent-free thermosetting electrically insulating resin composition which in the absence of filler can be maintained for hours as a free flowing liquid of less than 30,000 cps. at room temperature but cures upon moderate heating to provide tough, flexible, heat-resistant electrical insulation, said composition consisting essentially of a mixture of
   (A) polyglycidyl ether of bis(4-hydroxyphenyl)dimethylmethane having a viscosity of less than 30,000 cps. at 24° C. and containing at least 1.5 oxirane groups per average molecular weight,
   (B) a blend of
      (1) the carboxyl-containing reaction product of
         (a) castor oil having an iodine value of at least 50, the amount of castor oil being 50–110 parts by weight per 100 parts of said polyglycidyl ether, and
         (b) dibasic carboxylic acid anhydride selected from the group consisting of maleic anhydride and anhydride adducts of maleic anhydride and olefin, which adducts have a melting point not greater than 40° C., and
      (3) additional anhydride adduct of maleic anhydride and olefin, which adduct has a melting point not greater than 40° C., and
   (C) a catalyst which accelerates acid-curing epoxy resin compositions,
      which composition includes a ratio of oxirane groups of polyglycidyl ether to total carboxyl groups of said corboxyl-containing reaction product (1) plus unreacted anhydride groups within the range of about 1.1:1 to 1.5:1
      and includes sufficient anhydride to provide at least 1.2 anhydride groups, but not more than one group of maleic anhydride, for every hydroxyl group in the castor oil prior to reaction with the anhydride.

11. A solvent-free thermosetting electrically insulating resin composition which in the absence of filler can be maintained for hours as a free flowing liquid of less than 30,000 cps. at room temperature but cures moderate heating to provide tough, flexible, heat-resistant electrical insulation, said composition consisting essentially of a mixture of
   (A) polyglycidyl ether of bis(4-hydroxyphenyl)dimethylmethane having a viscosity of less than 30,000 cps. at 24° C. and containing at least 1.5 oxirane groups per average molecular weight,
   (B) a blend of
      (1) the carboxyl-containing reaction product of equivalent amounts of
         (a) castor oil having an iodine value of at least 50, the amount of castor oil being 50–110 parts by weight per 100 parts of said polyglycidyl ether, and
   (b) maleic anhydride, and
(2) anhydride adduct of maleic anhydride and olefin, which adduct has a melting point not greater than 40° C., and
(C) a catalyst which accelerates acid-curing epoxy resin compositions,
   which composition includes a ratio of oxirane groups of polyglycidyl ether to total carboxyl groups of said carboxyl-containing reaction product (1) plus anhydride groups of said anhydride adduct (2) within the range of about 1.1:1 to 1.5:1
   and includes for every carboxyl group of said carboxyl-containing reaction product at least 0.2 anhydride group of said anhydride adduct (2).

12. The method of making a solvent-free thermosetting electrically insulating resin composition which in the absence of filler is a free flowing liquid at room temperature but cures upon moderate heating to a tough, flexible, heat-resistant state affording excellent electrical insulating values at high temperatures, said method consisting essentially of forming a mixture of
(A) polyglycidyl ether or polyhydric phenol having a viscosity of less than 30,000 cps. at 24° C. and containing at least 1.5 oxirane groups per average molecular weight,
(B) liquid condensate of recinoleic acid and polyhydric aliphatic alcohol, which condensate has an iodine value of at least 50 and is present in the amount of 50–110 parts by weight per 100 parts of said polyglycidyl ether,
(C) dibasic carboxylic acid anhydride selected from the group consisting of maleic anhydride and anhydride adducts of maleic anhydride and olefin, which adducts have a melting point not greater than 40° C., and
(D) a catalyst which accelerates acid-curing epoxy resin compositions,
   in amounts providing a ratio of oxirane groups of polyglycidyl ether to anhydride groups of said dibasic carboxylic acid anhydride within the range of about 1.1:1 to 1.5:1
   and providing at least 1.2 anhydride groups for every hydroxyl group of said condensate.

13. The method as defined in claim 12 wherein said condensate is essentially completely esterified with the anhydride before admixture with the polyglycidyl ether.

14. The strong, shock-resistant, resinous cured product of the composition defined in claim 1.

15. A thermosetting resin composition as defined in claim 1 including a dibasic carboxylic acid anhydride having a melting point greater than 40° C. in an amount up to about half the total anhydride by weight but less than the amount which would otherwise increase the viscosity of the composition above 30,000 cps. at 24° C.

16. A thermosetting resin composition as defined in claim 2 wherein the at least 20% more anhydride groups are provided by a dibasic carboxylic acid anhydride which is different from the anhydride which is prereacted with said condensate.

References Cited
UNITED STATES PATENTS

| | | | |
|---|---|---|---|
| 3,438,909 | 4/1969 | Kleeberg et al. | 260—2 |
| 3,350,334 | 10/1967 | Skiff | 260—835 |
| 3,296,202 | 3/1967 | Schmitz-Josten | 260—47 |
| 3,278,456 | 10/1966 | Starcher | 260—2 |
| 3,268,477 | 8/1966 | Mueller | 260—78.4 X |
| 3,188,362 | 6/1965 | Delmonte et al. | 260—47 X |
| 3,078,235 | 2/1963 | Bowman et al. | 260—47 X |
| 2,999,824 | 9/1961 | Singleton et al. | 260—18 X |
| 2,921,040 | 1/1960 | May | 260—47 X |

OTHER REFERENCES

"Development of Flexible Polymers as Thermal Insulation in Solid Propellant Rocket Motors," Atlantic Research Co.: AD. 262,986, ASTIA, 1961; AD. 266,858, ASTIA, 1962; AD. 274,533, ASTIA, 1963; AD. 403,799, ASTIA, 1963.

DONALD E. CZAJA, Primary Examiner

C. W. IVY, Assistant Examiner

U.S. Cl. X.R.

260—2, 22, 37, 47, 78.4, 835